United States Patent Office 2,975,459
Patented Mar. 21, 1961

2,975,459
ELECTRICALLY CONDUCTIVE WIPER BLADE

Mieczyslaw Wojciechowski, Detroit, Mich., assignor to General Motors Corporation, Detroit, Mich., a corporation of Delaware No Drawing. Filed Oct. 11, 1956, Ser. No. 615,239

4 Claims. (Cl. 15—250.36)

This invention relates to elastomeric articles for use in wiping glass surfaces using water as a lubricant and in particular to a wiper for clearing windshield surfaces of water.

Generally speaking conventional elastomeric windshield wiper blades, in operation, move across the surface of a windshield relatively smoothly and efficiently when the windshield surface has a water film of substantial thickness thereon or is substantially dry. However when the glass surface of the windshield is in a semi-wet state, as for example is encountered near the end of a windshield wiping operation or when the windshield has a few drops of water splattered thereon, the blade exhibits a very high coefficient of friction relative to the semi-wet glass surface with a resultant irritating "chattering" of the blade, a high rate of lip wear of the wiper blade and a tendency to an overloading and stopping of the windshield wiper motor thereby requiring excessively strong motors to operate the wiper mechanism.

Among the objects of this invention to provide a windshield wiper blade to eliminate the tackiness and reduce the frictional drag of an elastomeric windshield wiper blade in wiping semi-wet glass surfaces. This is accomplished essentially by providing a wiper blade comprising an elastomer of an electrically conductive character which when operatively associated with a windshield is electrically grounded. A wiper blade may be made in accordance with the present invention by incorporating in a suitable rubber recipe a finely divided conductive filler material, preferably a conductive carbon black, in quantities which imparts an adequate electrical conductivity to the rubber and yet preserves the necessary flexibility and resilience required for satisfactory wiping operation.

Further objects and advantages of the present invention will be apparent from the following description.

An example of a recipe in accordance with which a suitable wiper blade having suitable electrical conduction properties may be made is as follows:

| | Parts by weight |
|---|---|
| Smoked sheet | 100.0 |
| Zinc oxide | 7.5 |
| Conductive carbon black | 48.5 |
| Stearic acid | 1.5 |
| Microcrystalline wax | 1.0 |
| Sulfur | 2.5 |
| Tetramethyl thiuram disulfide | 0.1 |
| Benzolthiazyl disulfide | 0.6 |
| Di-beta-naphthyl-para-phenylene diamine | 0.5 |

The conductive carbon black may suitably be Shawinigan acetylene black sold by Shawinigan Chemicals Ltd. which is manufactured by the burning of acetylene under controlled conditions and which when milled into a rubber mix in the proportions indicated herein imparts to the rubber a desired electrical conductivity. Useful blades in accordance with the invention may be made with a variation of the carbon black from about 20 to 70 parts based on 100 parts of the rubber. Other conductive blacks such as High Abrasion Furnace Black may be satisfactorily used as well as other suitable conductive materials. Satisfactory electrical conductive materials for imparting electrical conductive properties to elastomeric materials is thought to reside in poor dispersion properties of the material during the mixing of the elastomeric material whereby a conductive path is effected through adjacent particles of the material. The wax acts as a "blooming" agent in the finished blade whereby it is provided with self-lubricating properties and a high sun resistance, and its content may vary between ½ and 3 parts per 100 parts of rubber. The stearic acid is an accelerator activator and may vary between 1–3 parts. The tetramethyl thiuram disulfide and benzolthiazyl disulfide act as accelerators of vulcanization which react with the zinc oxide to form zinc salts which in turn reacts with the sulfur to form a sulfide acting as a faster curing agent than the sulfur alone. The former accelerator may be present in ranges of from about .07 to .12 parts and the latter from about .5 to 1 part. The di-beta-naphthyl-para-phenylene diamine acts as an antioxidant and may be present in ranges of from about 0.4 to 1 part.

The various addition agents such as accelerators and anti-oxidants and vulcanization agents form no part of the present invention since these materials and their use is well known in rubber chemistry. Other well known organic accelerators as mercaptobenzothiazole and antioxidants such as 2,2' methylene-bis (4 ethyl-6 tertiary butyl phenol) may be used in suitable proportions.

Various elastomeric materials which may be used include natural rubber as specified in the above recipe, polychloroprene, butadiene-acrylonitrile copolymers, butadiene-styrene copolymers and mixtures of these and other similar compositions. However natural rubber and polychloroprene are the preferred elastomeric materials.

In making a wiper blade a recipe as above indicated is mixed in a rubber mill in a conventional manner, and the mix is molded in the shape of a blade wherein in the case of natural rubber it is vulcanized by heating the molded part at about 290° F. for about six minutes in the mold. The wiping edge of the blade is finally slit to provide a suitable wiping edge, or lip, as is well known in the art. To reduce tackiness of the rubber, the outer surfaces of the blade are preferably chlorinated as for example by dipping the blade into an aqueous chlorine tank containing from ½ to 4% chlorine for about ten seconds.

The shape of the conductive rubber wiper blade above described may be made of the same shape as conventional rubber blades which may be associated with conventional metal wiper blade holders associated with automobile windshield wiper systems that are electrically grounded.

The use of the above described conductive wiper blade, in wiping semi-wet glass surfaces, results in a substantial reduction in chatter and frictional drag in wiping semi-wet surfaces. The effect of electrical conductivity on the frictional properties is indicated quantitatively by the following example. A pair of identical natural rubber wiper blades were made, one having conductive carbon black and one having nonconductive carbon black incorporated therein. In wiping a windshield the nonconductive blade indicated a tacky drag expressed by the power consumption of 6 amperes at 12 volts, of which 2½ amperes were spent on overcoming frictional resistance of the mechanism and 3½ amperes on frictional resistance of the wiper blades. In contrast the conductive wiper blades indicated a power consumption expressed by 4 amperes at 12 volts, or only 1½ amperes spent on frictional resistance of the wiper blades.

The reasons for the high tackiness or high coefficient of friction between conventional rubber wiper blades and semi-wet glass and the reason for the improved functioning of the conductive wiper blade of the present invention is not definitely known. However it is supposed that the high tackiness is partly caused by static charges created by the friction of the rubber blade on the glass, the very thin water layer causing close contact of the rubber and the glass, the condition necessary for high electrostatic forces. It is thought that the conductive rubber blade enables the charges to leak off to ground and prevent the build up of electrostatic charges causing tackiness.

While the embodiments of the present invention as herein disclosed constitute preferred forms, it is to be understood that other forms might be adopted.

What is claimed is as follows:

1. A wiper blade adapted for wiping contact with glass surfaces consisting of an electrically conductive elastomer throughout its full extent.

2. A vulcanized rubber glass wiper adapted for direct contact with glass and comprising rubber containing throughout its full extent electrically conductive carbon in sufficient quantities to impart electrical conductive properties on the wiper.

3. A wiper blade for wiping the windshield of a vehicle wherein the wiper blade is electrically grounded to the vehicle, said blade consisting throughout its full extent of an electrically conductive elastomer.

4. A windshield wiper blade for use in connection with a vehicle for wiping the glass windshield thereof, comprising; an elongated elastomeric blade consisting throughout its full extent of vulcanized elastomeric material including sufficient conductive carbon black to ground the windshield when the blade is connected to ground.

References Cited in the file of this patent

UNITED STATES PATENTS

| | | |
|---|---|---|
| 1,825,376 | Vaughn | Sept. 29, 1931 |
| 1,978,633 | Horton | Oct. 30, 1934 |
| 2,126,733 | Catt | Aug. 16, 1938 |
| 2,132,268 | Mallard | Oct. 4, 1938 |
| 2,353,462 | Harkins | July 11, 1944 |
| 2,354,440 | Brown | July 25, 1944 |
| 2,818,534 | Horne | Dec. 31, 1957 |

OTHER REFERENCES

"Rubber Chemistry & Technology," vol. 15, 1942, pages 146–149.